United States Patent Office 3,847,831
Patented Nov. 12, 1974

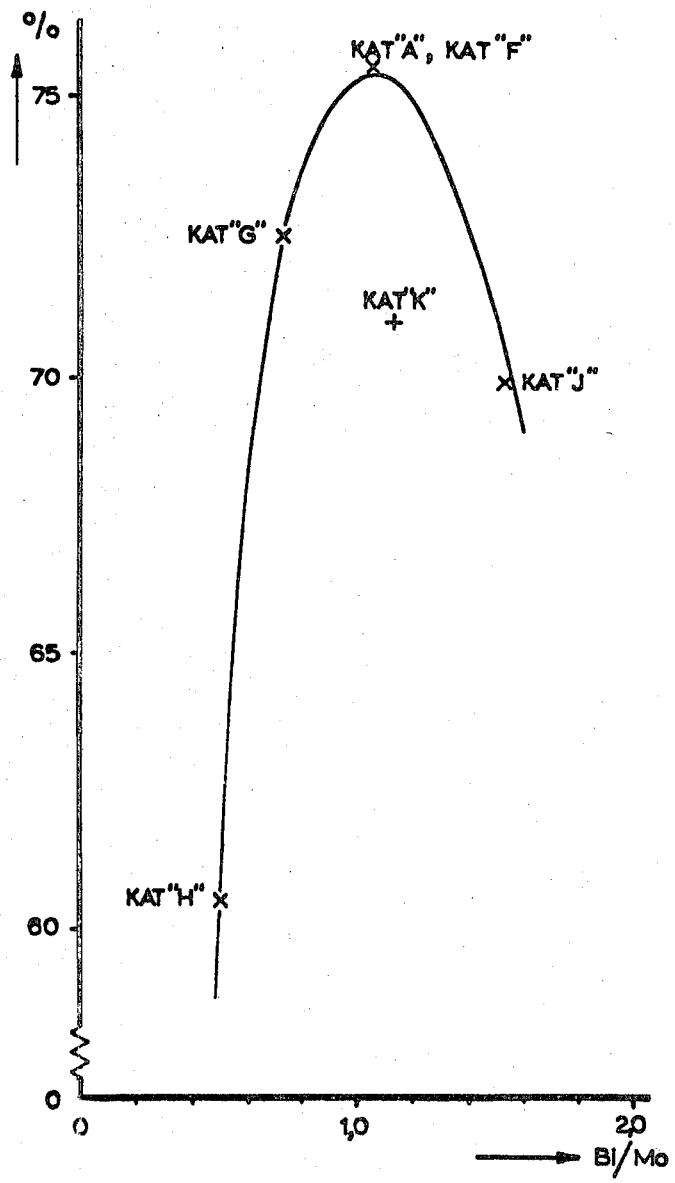

3,847,831
CATALYST FOR PREPARING UNSATURATED NITRILES
Hendrik Bruins Slot and John W. Geus, Geleen, Netherlands, assignors to Stamicarbon N.V., Heerlen, Netherlands
Filed Sept. 29, 1970, Ser. No. 76,438
Claims priority, application Netherlands, Sept. 30, 1969, 6914739; Nov. 21, 1969, 6917539; Mar. 4, 1970, 7003066
Int. Cl. B01j 11/22
U.S. Cl. 252—470     8 Claims

ABSTRACT OF THE DISCLOSURE

A process for the preparation of a catalyst containing oxides of bismuth, molybdenum and iron. An aqueous acid solution of bismuth and an aqueous alkaline solution of iron in an atmoic ratio of up to 0.4:1 relative the bismuth ions, are gradually brought together forming a precipitate. In a second step, the precipitate thus formed is suspended in an aqueous medium at a controlled pH, and while heating and agitating the suspension, an aqueous solution of ammonium molybdate is gradually introduced while maintaining the pH of this suspension above about 2.5. The amount of ammonium molybdate introduced is in excess of a molybdenum to bismuth atomic ratio of 1:1 by an amount of molybdenum stoichiometrically equivalent to the quantity of iron precipitated in the first step. The resulting suspension is heated at or near the boiling temperature of at least 6 hours. To increase the proportions of iron in the catalyst system, additional molybdenum may be added in the second step in an amount stoichiometrically equivalent to the additional iron ions to be added, and subsequently, by a third step, the pH of the suspension is lowered whereupon a solution of a tri-valent iron salt is gradually introduced. The suspension is maintained at or near the boiling temperature until substantially all of the tri-valent iron has been taken up by the precipitate.

---

The invention relates to the preparation of a catalyst system for the ammoxidation of olefins, using the oxides of bismuth and molybdenum as the basic catalyst system, whether or not with varying quantities of other metal oxides.

Generally, in dehydrogenating oxidations and ammoxidations of olefines to unsaturated aldehydes or ketones, or the corresponding nitriles, catalysts have been proposed which contain metals or metal oxides or compounds of, for instance, the following metals: chromium, copper, vanadium, manganese, iron, cobalt, nickel, molybdenum, silver, zinc, cadmium, tin, tungsten, rhenium, lead, platinum, gold, aluminium, palladium, rhodium, bismuth, uranium, and cerium; see U.S. Pat. 2,691,037.

More particularly, it is known that, in the presence of oxygen and ammonia, olefines can be converted to unsaturated nitriles with the aid of catalysts based on bismuth and molybdenum (U.S. Pat. 2,904,580). In this process a mixture of propylene, air and ammonia is brought into contact, in a solid or fluidised bed, with a catalyst which contains a bismuth salt of molybdenic acid, more particularly bismuth phosphomolybdate, as the active component. A great many variations of this type of catalyst have been proposed. For example, U.S. Pat. 3,226,422 proposes to prepare a catalyst by adding iron oxide to the above-mentioned compounds, in which case less of the unwanted acetonitrile is obtained as a by-product than when use is made of the first-mentioned catalyst. Said catalyst is prepared by concentrating, by evaporation, the nitrates of iron and bismuth together with ammonium paramolybdate and a (possibly small) quantity of phosphoric acid. U.S. Pat. 3,347,899 proposed to prepare a catalyst based on the bismuth salt of ferric molybdenic acid, the ratio of iron to molybdenum being invariably 2:12. Later, French Pat. 1,367,764 proposed to prepare a catalyst by first precipitating bismuth silicate via a reaction between bismuth nitrate and sodium silicate with addition of ammonia. Next, iron nitrate is made to react with an ammoniacal solution of ammonium molybdate, whereupon the filtered-off reaction product is mechanically mixed with the bismuth silicate; the mixture thus obtained is calcined. Finally, Russian Pat. 202,883 proposes mechanical mixing of a bismuth-phosphor-molybdenum catalyst with metallic iron and calcination of the product obtained, whilst the Russian Pat. 193,484 proposes the use of a catalyst which contains dehydrogenating oxides such as those of aluminium, magnesium, iron, chromium or zinc, besides bismuth molybdenum oxide.

It is also known that the gros chemical composition of a heterogeneous catalyst built up of several components is not the only factor governing its activity and selectivity. Said properties depend on the chemical constitution of the catalyst system and on the texture of the various chemical compounds. Here, by texture is understood the shape and the dimensions of the elementary particles in the system and of the voids between the elementary particles, and the way in which the elementary particles are linked up with one another. Both the chemical constitution and the texture depend to a large extent on the method followed in preparing the catalyst system. Particularly with multi-component catalyst systems a difference in the method of preparation may lead to considerable variations in catalytic activity and selectivity.

The present invention relates to a process for the preparation of stable catalysts for the ammoxidation of olefines on the basis of the oxides of bismuth and molybdenum, whether or not with varying quantities of other metal oxides, in which process the highly specific chemical constitution and texture required for achieving optimum catalytic activity and selectivity are obtained in a reproducible manner which may also be applied on industrial scale operations.

According to this invention these objectives are achieved by increasing, in a first step, the pH of a solution of a bismuth compound and possibly a compound of one or more elements of the first transition series of the Periodic System of Elements (see "Handbook of Chemistry and Physics," 46th Edition, 1965–1966, elements Nos. 21 to 30) to a value at which virtually all metal ions have been precipitated out of the solution, whereupon the precipitated compounds are separated from the liquid and washed. In a second step, said precipitated compounds are suspended in water; and, to the suspension so obtained, a solution of ammonium molybdate is added, gradually and under controlled conditions, at increased temperature and with vigorous agitation, taking care of the pH value of the suspension does not drop below 2.5. After the addition of ammonium molybdate has been finished, the suspension is heated for some time, if necessary, and the solid matter is subsequently separated from the liquid and subjected to further treatment. After drying and calcination at a temperature in excess of 400° C., by preference at 550° C., the product thus obtained can be used as a catalyst. It is also possible to dilute the mass with a suitable inert substance. The product may, for instance, be suspended in a sol. with 30% to 50% by weight of $SiO_2$, following which a very suitable catalyst can be obtained by concentrating, through evaporation, the suspension so obtained, with simultaneous agitation, and by subsequently calcining it at a temperature of over 400°

C., by preference at 540 to 560° C. An excellent catalyst can also be obtained by spray-drying the suspension in the colloidal silica solution.

Essential to the present process is the sequence in which and the speed with which the constituents are brought together under controlled conditions of acidity during said procedures.

In this connection three factors have appeared to be of influence on the results of the process and the ultimate composition of the product:

(1) The dimensions and the relative distribution of the particles of the basic bismuth compound. In order to obtain small particles with a proper relative distribution it is desirable that a solution of the bismuth compound be gradually added to an aqueous medium, the pH of which is kept at a virtually constant value of more than about 7. The gradual addition of the solution of the bismuth compound (and, possibly, of the compound of the transition elements) is preferably effected by "injection" into the aqueous medium, the pH value of which is kept virtually constant by simultaneous "injection" of ammonia.

(2) The pH of the suspension of the basic bismuth compound in water, to which a solution of ammonium molybdate is added gradually and under controlled conditions, is adjusted to a value below 7, preferably between 2.5 and 7, and more particularly between 3.5 and 4.5; and (3) The chosen period during which the suspension is still being heated at or near boiling temperature is preferably in excess of 6 hours.

When the above conditions are met, all the molybdenum is rendered insoluble, so that no molybdenum is lost with the filtrate, or in any other way, and well-reproducible compositions are obtained which correspond with the ratios of the starting materials added. Said processing conditions are not only of significance in case the catalyst is recovered from the solution by filtration, but also when the catalyst is obtained by spray-drying or removal of water from the suspension by evaporation. If molybdenum should be present in uncombined condition as a result of an improper pH adjustment or too short a heating period, it will be expelled during the drying and calcination of the mass, so that the desired composition is not obtained.

In carrying out the process according to the invention, simple salts of the elements to be employed can be used as starting materials, such as the chlorides and, more particularly, nitrates of the transition metal and of bismuth, and the ammonium salt of molybdenic acid. In general, mineral acid salts of the transition metals are suitable starting materials. These are used in dilute solutions. One or more elements of the first transition series of the Periodic System of Elements can be employed. Suitable elements are iron and cobalt, nickel, chromium, manganese or copper. Iron, in particular, gives very good results. The atomic ratio between these transition metals on the one hand and bismuth on the other can be adjusted as required between the limits of 1:25 and 1:2.5.

The gradual and controlled addition of the ammonium molybdate in the second step of the process is preferably carried out by injection of an ammonium molybdate solution into the suspension of the bismuth compound obtained in the first step. By "injection" is understood here contacting the ammonium molybdate solution with the suspension without any other phase being present in the immediate vicinity. By this procedure an extremely rapid distribution of the solution in the vigorously agitated suspension is obtained without the distribution being impeded by surface tensions, so that the molybdate ions concentration remains homogeneous and does not locally build up to high values. To achieve this, the quantity of ammonium molybdate solution to be injected during the reaction should preferably not exceed a value corresponding with 0.1 gram mole of $MoO_4$ per litre of suspension per hour. An advantage of the injecting method is that it can be stopped if the concentration of molybdate ions should become too high during the reaction when the reaction of the molybdate ions with the suspended compounds cannot keep pace with the supply of molybdate ions.

Continued investigation into the subject of the invention has shown that, in addition to the atomic proportion of the elements of the first transition series to the bismuth, the atomic proportion of bismuth to molybdenum is of importance, particularly in relation to the selectivity of the present catalyst system for the formation of acrylonitrile.

An atomic bismuth-molybdenum proportion in the bismuth-molybdenum compounds of the catalyst system of approximately 1:1 not only results in a high activity, but also in maximum selectivity for the ammoxidation of propylene to acrylonitrile. It is explicitly stated here that the presence, apart from bismuth, of elements of the first transition series in the catalyst system in appreciable quantity, causes the gross atomic bismuth-molybdenum ratio to deviate from 1:1, notably to the extent to which a stoichiometric amount of molybdenum, referred to the relevant transition element, is taken up.

Further it has appeared that difficulties will arise in the case of extensive replacement of bismuth by iron in the catalyst system. When the iron content is increased, it will be insufficiently bound by molybdate in the second step of the preparation. This will lead to the formation of iron oxide in the catalyst system during the further processing of the precipitate formed, so that the activity and selectivity of the catalyst stem, when used for the ammoxidation of propylene to acrylonitrile, is influenced detrimentally.

It has been found that the presence of iron, amongst the transition metals employed, in an atomic ratio to bismuth of more than 1:2.5, all metal ions, except the iron, are precipitated out of the solution in the first step, which precipitated compounds are separated from the liquid; provided that the amount of ammonium molybdate added in the second step deviates from the atomic 1:1 ratio of bismuth to molybdenum to such a degree as corresponds with the content of the compounds of elements of the first transition series which have precipitated side by side with the compound of bismuth, following which the suspension thus obtained is still heated for some time, whereupon such an amount of ammonium molybdate is added as agrees, stoichiometrically, with the quantity of iron ions to be added only after a third step has been reached; provided further that, in this third step, the pH of the suspension is at first gradually and homogeneously decreased to a value of less than 1.8, whereupon a solution of a trivalent iron salt is gradually injected into the suspension, whilst a pH value of between 1.5 and 1.8 is maintained. The suspension is still heated for some time and the solid matter is finally separated from the liquid, following which, in a fourth step, the separated mass is mixed with an aqueous suspension of an inert substance at a pH value of less than 7 and subjected to further treatments.

Essential to this present process are the sequence and the speed with which the constituents are brought together and the control of the conditions of acidity during this procedure. If a molybdate-containing solution is brought into contact with the suspended bismuth compound at an incorrect pH value, the result will be a less active catalyst. The presence (perhaps locally) of two high a concentration of molybdate ions during the reaction with the suspended bismuth compound will not lead to an optimum chemical constitution of the catalyst system either. It is further essential to the process that the iron ions are not added until molybdate ions have reacted with the suspended bismuth compounds, in which the degree of acidity is also determinative of the result to be achieved.

The solution of the trivalent iron salt is preferably injected at a rate corresponding with 0.05 grammolecule of Fe(III) per liter of suspension per hour.

Although this is not necessary, the process is, as a rule, carried out at the boiling temperature. During the various steps the suspension is heated for some time at said temperature; the period may vary from 3 to 24 hours. Preferably, the suspension is kept at or near boiling temperature for 6 hours during the second step and for 3 hours at the end of the third step.

During further treatments of the obtained catalyst mass with aqueous suspensions of inert substances, such as a solution of colloidal silica, the pH value should be below about 7. At higher pH values the carefully formed compounds will decompose, attended by isolation of iron oxide, which unfavourably affects the activity and selectivity of the catalyst system in the ammoxidation of propylene to acrylonitrile. A key to the question whether or not the carefully formed compounds are retained during the subsequent processings is that, during and shortly after the preparation, the color of the catalyst corresponds with a shade of yellow as indicated by the colors G.V.V. 415 to G.V.V. 420 of the standard 1968 color range of the G.V.V. group of large users of paints in the Netherlands.

The catalyst according to the invention is suitable for the preparation of unsaturated nitriles, more particularly for the preparation of acrylonitrile from propylene, ammonia and oxygen (air). In the latter case, temperatures of between 200° C. and 600° C., preferably between 400° C. and 500° C., are applied. The contact time of the reactants from the catalyst bed may be varied within wide limits; preference is given to a contact time of 3 to 8 seconds. Normally, a slight excess of ammonia in relation to the propylene is used. The molar ratio of propylene to ammonia is preferably 1:1.05 to 1:1.25. As a rule, the quantity of air is taken 5 to 15 times larger than that required theoretically. If desired, water vapour may also be added to the reaction mixture. The reaction can be carried out both at atmospheric pressure and at elevated pressure of up to, for instance about 5 bars. During the reaction the catalyst bed may be in fluidised form or in packed form. In the latter case it will generally be necessary to dilute the catalyst with an inert material, for instance with silica, to achieve proper temperature control.

EXAMPLES

The invention is illustrated with the aid of comparative examples. First a catalyst which contains bismuth, iron, molybdenum and silica and prepared according to the process of the invention (catalyst A) is compared with catalysts containing bismuth, iron, molybdenum and silica prepared by other methods and having virtually the same gross chemical composition (catalysts B and E), as well as with catalysts containing bismuth, iron, molybdenum and silica prepared by the process according to French Pat. 1,367,764 (catalysts C and D).

The five catalysts were compared in a test reactor under virtually identical reaction conditions. For this purpose a fluidised catalyst bed was employed; the use of a solid catalyst bed also gives good results.

Catalyst A (according to the invention)

14.4 g. of Fe(NO$_3$)$_3$.9 aq. and 158 g. of Bi(NO$_3$)$_3$.5 aq. were dissolved in concentrated nitric acid. The solution obtained was introduced into 2 liters of water, whereupon the pH value proved to be about 0.5. Next, 700 ml. of 5 N ammonia were quickly added to the vigorously agitated solution, which resulted in a pH value of 7. The brownish-white precipitate obtained was filtered off and washed. This material was subsequently suspended in 2 liters of water, whereupon the suspension, which had a pH value of 7, was heated to boiling temperature. Over a period of 10 hours, a solution of 98.8 g. of $$(NH_4)_6Mo_7O_{24}.4 \text{ aq.}$$

in 400 ml. of water was injected into this suspension. The pH value of the injected solution amounted to 6. During the injection the pH value of the suspension decreased very regularly from 7 to 4.8. After the mixture had been kept at boiling temperature for another 6 hours, a high-viscosity, pale yellow suspension was obtained. The solid material was then filtered off, the clear filtrate containing only small quantities of iron and molybdenum. The mass was washed and dried at a temperature of 120° C. The composition of a sample was as follows: Fe 0.6% by weight, Bi 51.0% by weight, and Mo 23.8% by weight. After having been ground, the solid matter was so suspended in a solution of colloidal silica with 40% by weight of SiO$_2$ (known by the trade name of Ludox) that the end-product contained 60% by weight of the bismuth-iron-molybdenum oxide mixture and 40% by weight of SiO$_2$. The mass was subsequently concentrated by evaporation, with continuous agitation. The dried product was again ground and then calcined at 500° C. for 3 hours. After the calcination, a fraction of 75 to 175 microns was sieved off; 27.7 g. of this fraction with a bulk weight of 1.11 g./ml. were used in the test reactor.

Catalyst B (not according to the invention)

A bismuth-iron compound was precipitated and washed by the method described for the first step in the example for catalyst A. Next, 95.8 g. of (NH$_4$)$_6$MoO$_7$O$_{24}$.4 aq. were dissolved in 2 liters of water, whereupon the pH value of the solution was adjusted to 3.5 with nitric acid. The above-mentioned iron-bismuth compound was suspended in said solution, and the suspension was kept at boiling temperature for 20 hours. During this process the pH value dropped from 3.5 to 2.7. The whitish-yellow suspension obtained was then filtered off and washed. The yellow filtrate contained a little molybdenum. The composition was the same as that of catalyst A. The product was subsequently treated in exactly the same way as catalyst A; 27.5 g. of the material were used in the test reactor.

Catalyst C (not according to the invention)

This catalyst is obtained by dissolving 970.2 g. of bismuth nitrate in 2 liters of water containing 90 ml. of concentrated nitric acid. 400 g. of 30% potassium silicate, diluted with water to give a volume of 2 liters, are added to this solution. Next, ammonia is added to the solution until the liquid shows a neutral reaction. The white bismuth silicate crystals are filtered off and washed. 1074.6 g. of iron nitrate are then dissolved in 1 liter of water, following which an ammoniacal solution of 706.2 g. of ammonium molybdate are added. The obtained precipitate is filtered off, ground together with the still moist bismuth silicate and dried, whereupon the dried mixture is calcined for 6 hours at 500° C. in a stream of air. The composition of the catalyst in question is reported to be as follows: 0.75 (BiO)$_2$—Si$_2$O$_5$.Fe(MoO$_4$)$_3$; 28 g. of the material were used in the test reactor.

Catalyst D (not according to the invention)

This catalyst is obtained by combining 863.7 g. of molybdenic acid and 1455.5 g. of bismuth nitrate, dissolved in 996 ml. of water, to which have been added 133.3 ml. of concentrated nitric acid, and 1212 g. of iron nitrate dissolved in 400 ml. of water. The suspension obtained is vigorously agitated. After evaporation of the moisture and drying, the mass is ground for 6 hours and calcined in a stream of air at 500° C.; 28 grams of the material were used in the test reactor.

Catalyst E (not according to the invention)

This catalyst was obtained by suspending in 2 liters of water 16 g. of highly disperse silica loaded with 10 g. of iron (III) oxide, 16 g. of highly disperse silica loaded with 28.4 g. of bismuth oxide, and 17.3 g. of pure molybdenum trioxide. After 10 g. of urea had been added to the suspension, it was kept at boiling temperature for 20 hours, during which period the pH value increased from 3.2 to 5.7. The solid matter was then filtered off, dried at 120° C. and calcined for 1 hour at 500° C.; 27.7 g. of the material were used in the test reactor. The gross chemical composition was virtually the same as that of catalysts A and B.

The catalysts A, B, C, D and E were used in fluidised condition, in a test reactor having a diameter of 2 cm. The total gas load amounted to approximately 10 N liters per hour, which means that the contact time of the reaction gas with the fluidised catalyst was 3 seconds.

The reaction temperature was:

435° C. for catalyst A,
451° C. for catalyst B,
440° C. for catalyst C,
440° C. for catalyst D, and
435° C. for catalyst E.

The molar ratio of propylene to ammonia and air was:

1:1.15:9.5:(1.5 $N_2$) for catalyst A,
1:1.06:7.86 for catalyst B,
1:1.0:4.0:(2.6 $H_2O$) for catalyst C,
1:1.0:4.9:(2.6 $H_2O$) for catalyst D, and
1:1.5:9.5 for catalyst E.

The product gases were immediately analysed by gas-chromatographic techniques. The results of the analyses were as follows:

| Catalyst: | Propylene conversion, in percent by vol. | Selectivity, in percent by volume, for— | | |
|---|---|---|---|---|
| | | Acrylo-nitrile | Aceto-nitrile | Acrolein |
| A | 95.5 | 79.5 | 2.8 | 0.4 |
| B | 79.0 | 77.5 | 2.6 | 2.3 |
| C | 78.4 | 74.4 | 5.4 | 3.2 |
| D | 81.0 | 75.0 | 4.5 | 5.7 |
| E | 61.5 | 27.0 | 1.5 | 0.3 |

Here, by selectivity is understood:

$$\frac{\text{Percent by volume of product}}{\text{Percent by volume of converted propylene}} \times 100\%$$

From these results it appears that with the gross chemical compositions (catalysts A, B and E) being equal, there is a marked difference in conversion and selectivity. The catalysts C and D yield less favorable results as well.

The following examples show that the acrylonitrile yield is highest at a bismuth to molybdenum atomic ratio of 1:1. The comparison relates to the following catalysts:

Catalyst A (as described previously). Analysis:

Fe: 0.6% by weight,
Bi: 51.0% by weight, and
Mo: 23.8% by weight.

Catalyst F, prepared according to the method for catalyst. Analysis:

Fe: 0.7% by weight,
Bi: 56.4% by weight, and
Mo: 25.6% by weight.

This catalyst was prepared by solving 6 g. of

Fe(NO$_3$)$_3$.9 aq. and 160.2 g. of Bi(NO$_3$)$_3$.5 aq. in 500 ml. of water, to which such an amount of nitric acid had been added that a pH value of 0.5 was obtained. The clear solution was injected, over a period of 2 hours and at room temperature, into 2 liters of an ammonia solution, at a point below the liquid surface. The pH value was kept at 8.1 by simultaneous injection of an ammonia solution of 10% by weight. The precipitate then formed, having a homogeneous, pale yellow color, was filtered off and washed.

This material was subsequently suspended in 2 liters of water, whereupon the suspension, the pH value of which had been adjusted to 4 with the aid of nitric acid, was heated to boiling temperature. Over a period of 10 hours, a solution of 20.8 of (NH$_4$)$_6$Mo$_7$O$_{24}$.5 aq in 300 ml. of water was injected into this suspension, during which period the pH value of the suspension decreased very regularly from 4 to 3.6, whilst its color changed during the injection from brownish yellow to white. After the mixture had been kept at boiling temperature for another 16 hours, a high-viscosity, white suspension was obtained. The solid matter was subsequently filtered off and the filtrate, which was now colorless, appeared to contain no iron or molybdenum. The mass was washed and dried at a temperature of 120° C. The composition of a sample was as follows: Fe 0.7% by weight, Bi 56.4% by weight, and Mo 25.6% by weight.

After having been ground, the solid matter obtained was so suspended in a solution of colloidal silica with 40% by weight of SiO$_2$ (known by the trade name of Ludox) that the end-product contained 60% by weight of the bismuth-iron-molybdenum oxide mixture and 40% by weight of SiO$_2$. The mass was then concentrated by evaporation, with constant agitation. The dried product was again ground and subsequently calcined for one hour at 550° C. After the calcination, a fraction of 75 to 175 microns was sieved off, some 28 g. of which were used in the test reactor.

Other catalysts were prepared accordng to the same method as used for catalyst F. The catalysts in question were the following:

Catalyst G. Analysis:

Fe: 0.5% by weight
Bi: 45.4% by weight, and
Mo: 30.0% by weight.

Catalyst H. Analysis:

Fe: 0.7% by weight
Bi: 36.4% by weight, and
Mo: 34.8% by weight.

Catalyst J. Analysis:

Fe: 0.8% by weight
Bi: 60.5% by weight, and
Mo: 20.3% by weight.

Catalyst K. Analysis:

Fe: absent
Bi: 55.7% by weight, and
Mo: 22.3% by weight.

Comparative tests were conducted on the above-mentioned catalysts in the previously described reactor. The tested quantity of catalyst amounted to approximately 28 g., the gas load consisted of about 10 N liters per hour at a molar ratio of propylene to ammonia and air of 1:1.20:9.5, whilst the reaction temperature was 450° C.

The results of the tests are shown in the following table:

| Catalyst: | Atomic ratio, Fe:Bi:Mo | Propylene conversion, in percent by vol. | Selectivity for acrylo-nitrile | Yield, in percent by vol. |
|---|---|---|---|---|
| A | 1:22.8:23.2 | 94.5 | 0.800 | 75.5 |
| F | 1:21.6:21.3 | 95.0 | 0.795 | 75.5 |
| G | 1:24.4:35.2 | 94.0 | 0.770 | 72.5 |
| H | 1:14.0:29.5 | 85.0 | 0.710 | 60.5 |
| J | 1:20.3:14.8 | 93.5 | 0.750 | 70 |
| K | 0:1.13:1.0 | 94.0 | 0.755 | 71 |

In the graph of the figure of the drawing herewith, the acrylonitrile yield, in percent by volume, is plotted on the vertical axis against the bismuth to molybdenum atomic ratio on the horizontial axis. Here, by acrylonitrile yield is understood the propylene conversion (in percent by volume) multiplied by the selectivity for acrylonitrile. The figure shows that a relatively high yield is obtained in a rather wide area, but also that an atomic bismuth to molybdenum ratio of about 1:1 is attended by a yield with a rather sharp maximum. Moreover, it appears that with the process according to this inventoin, catalysts can be obtained the properties of which can be changed by changing the composition.

The compositions of the catalysts A and F are practically identical, but the ratios between the starting materials were different, as appears from the data mentioned above.

Catalyst K, mentioned in the table, contained only bismuth and molybdenum. From the drawing it is quite apparent that, although the bismuth to molybdenum ratio virtually amounts to 1:1, the yield deviates appreciably from that of the catalysts A and F, which contain iron as component of the oxidic system. This is a clear illustration of the promoting action of iron as one of the elements of the first transition series.

The invention is further illustrated with the aid of examples relating to catalysts that contain bismuth, iron, molybdenum and silica, with a high iron to bismuth ratio, prepared according to the process of the invention.

Catalyst M has been prepared by the process of the example for catalyst F, iron having been added in the first step. The other catalysts have been prepared according to the improvement of the process of the invention, with iron being added in the third step, like that of catalyst N. The treatment of catalyst O with a sol. of silica, however, has been carried out at an improper degree of acidity (pH value 9.5).

Catalyst M 24 g. of $Fe(NO_3)_3 \cdot 9$ aq. and 58.4 g. of $Bi(NO_3)_3 \cdot 5$ aq. were dissolved in 500 ml. of water to which so much nitric acid had been added that a pH value of 0.5 was obtained. The clear solution was injected, over a period of 2 hours and at room temperature, into 2 liters of ammonia solution, at a point below the liquid surface.

The pH value was kept at 8.0 by simultaneous injection of an ammonia solution of 10% by weight. The gelatinous precipitate then formed, having a homogeneous, rust-brown color, was filtered off and washed with hot water. This material was subsequently suspended in 2 liters of water. It proved difficult to process the gelatinous material into a homogeneous suspension. The suspension, the pH value of which had been adjusted to 4 with the aid of nitric acid, was then heated to boiling temperature. Over a period of 5 hours a soltuion of 37.2 g. of $$(NH_4)_6Mo_7O_{24} \cdot 4$$ 

aq. in 300 ml. of water was injected into this suspension. During the injection the pH value of the suspension very gradually decreased from 4 to 3.6, and its color changed from rust-brown into pale brown to beige. After the mixture had been kept at boiling temperature for 16 more hours, a high-viscosity suspension was obtained. Next, the solid matter was filtered off and the colorless filtrate appeared to contain no iron or molybdenum. The mass was washed and dried at a temperature of 120° C. The composition of a sample was as follows: Fe 4.8% by weight, Bi 36.7% by weight; Mo 30.7% by weight.

After having been ground, the solid matter obtained was so suspended in a solution of colloidal silica with 40% by weight of $SiO_2$ (known by the trade name of Ludox) having a pH value of 9.5, that the end-product contained 60% by weight of the bismuth-iron-molybdenum oxide mixture and 40% by weight of $SiO_2$. The mass was then concentrated by evaporation, with constant agitation. The dried product was again ground and subsequently calcined for one hour at 560° C. After the calcination, a fraction of 75 to 175 microns was sieved off, some 28 g. of which were used in the test reactor.

Catalyst N (according to the improvement of the invention)

72 g. of $Bi(NO_3)_3 \cdot 5$ aq. were dissolved in 2 liters of water to which such a quantity of concentrated nitric acid was added that a pH value of about 0.5 was obtained. Next, so much 5 N ammonia was injected into this solution that a pH value of 7.7 was obtained. A white precipitate was formed, which was filtered off and washed with hot water.

This material was subsequently suspended in 2 liters of water, following which the suspension was heated to boiling temperature. Over a period of 5 hours, a solution of 26.2 g. of $(NH_4)_6Mo_7O_{24} \cdot 4$ aq., dissolved in 200 ml. of water, was then injected into the suspension. During the injection the pH value of the suspension dropped from 7 to 5, whereupon by injection of diluted nitric acid the pH value was adjusted to 3.8. After the mixture had been kept at boiling temperature for another 6 hours, a viscous, pale yellow suspension was obtained. In a period of one hour, 39.5 g. of $(NH_4)_6Mo_7O_{24} \cdot 4$ aq., dissolved in 200 ml. of water, were then injected, after which the pH value was adjusted to 1.8 by injection of diluted nitric acid.

Subsequently, 60 g. of $Fe(NO_3)_3 \cdot 9$ aq. dissolved in 300 ml. of acidified water, were injected over a period of 4 hours, during which procedure the pH value decreased to 1.5. The color of the suspension turned yellow. After the suspension had been kept at boiling temperature for another 3 hours, the solution no longer contained any Fe(III). By filtration, the solid matter could very rapidly be separated from the liquid and washed. After having been dried for 16 hours at 120° C., the sample had the following composition: Fe 7.5% by weight, Bi 27.2% by weight, and Mo 33.4% by weight.

The solid matter obtained was ground and so suspended in a sol. of silica with 10% by weight of $SiO_2$ at a pH value of 6, that the end-product contained 60% by weight of the iron-bismuth-molybdenum oxide mass and 40% by weight of $SiO_2$. The mass was then processed in a similar way as catalyst M.

The analysis of the catalysts in question were the following:

Catalyst M. Analysis:

Fe: 4.8% by weight,
Bi: 36.7% by weight, and
Mo: 30.7% by weight.

Catalyst N. Analysis:

Fe: 7.5% by weight,
Bi: 27.2% by weight, and
Mo: 33.4% by weight.

Other catalysts were prepared according to the same method as used for catalyst N. The catalysts in question were the following:

Catalyst O. Analysis:

Fe: 7.5% by weight,
Bi: 27.2% by weight, and
Mo: 33.4% by weight.

Catalyst P. Analysis:

Fe: 5.1% by weight,
Bi: 42.0% by weight, and
Mo: 29.4% by weight.

The above catalysts and catalyst F have been subjected to comparative tests in the previously described reactor. The tested quantity of catalyst amounted to about 28 g., the gas load was about 10 N liters per hour at a molar ratio of propylene to ammonia and air of 1:1.20:9.5, whilst the reaction temperature amounted to some 450° C.

The results of the tests are shown by the following table:

| | Atomic ratio, Fe:Bi:Mo | Propylene conversion, in percent by volume | Selectivity for acrylonitrile |
|---|---|---|---|
| Catalyst: | | | |
| M | 1:2.1:3.7 | 81.0 | 0.730 |
| N | 1:1:2.6 | 95.0 | 0.780 |
| O | 1:1:2.6 | 81.0 | 0.720 |
| P | 1:2.2:3.4 | 94.5 | 0.780 |
| F | 1:21.6:21.3 | 95.0 | 0.795 |

A comparison of the catalysts F, P and N clearly shows that bismuth may be largely replaced by iron without being attended by a significant decrease in the activity and the selectivity when the present, improved process is applied.

The unimproved process has shown not to be satisfactory for higher atomic iron-bismuth ratios, as becomes apparent from a comparison of the catalysts M and P, whilst also the importance of the proper pH value in the further treatment with a sol. of silica is illustrated by the comparison of the catalysts N and O.

What is claimed is:

1. A process for the preparation of a catalyst system containing oxides of bismuth, molybdenum and iron which consists essentially in carrying out the steps of:
    (A) forming an aqueous acid solution containing ions of bismuth, and ions of iron in an atomic ratio no greater than 0.4:1 relative to said bismuth ions, and an aqueous alkaline solution, injecting one of said solutions into the other while maintaining the pH of the resulting aqueous solution at a virtually constant value of at least about 7 whereby a precipitate of compounds of said ions is formed, and separating said precipitate from said resulting aqueous solution;
    (B) forming a suspension of said precipitate in an aqueous medium, adjusting the pH of said suspension to a value of between about 2.5 and 7, and while heating and agitating said suspension, and maintaining the pH of said suspension at a value of greater than about 2.5, introducing an aqueous solution of ammonium molybdate into said suspension in an amount in excess of a molybdenum to bismuth atomic ratio of about 1:1 by an amount of molybdenum stoichiometrically equivalent to the quantity of iron precipitated in step (A), and at a rate no greater than 0.1 gram mole of $MoO_4$ per liter of suspension per hour, thereafter heating said suspension at or near the boiling temperature for a period of at least 6 hours whereby substantially all of said molybdenum is taken up by said precipitate.

2. The process of claim 1 wherein, in step (A), said aqueous acid solution is gradually injected into said aqueous alkaline solution and wherein the pH of said resulting aqueous solution is maintained at a virtually constant value of at least about 7 by the simultaneous injection of aqueous ammonia.

3. The process of claim 1 wherein, in step (B), the pH of said suspension is adjusted to a value of between about 3.5 and 4.5, and wherein said aqueous solution of ammonium molybdate is introduced into said suspension by injection.

4. The process of claim 1 with the additional step, subsequent to step (B), of removing said precipitate from said suspension and mixing the separated precipitate with an aqueous suspension of an inert substance at a pH value of less than about 7 whereafter the resulting solids mixture is calcined at a temperature of at least about 400° C.

5. The process of claim 1 wherein, in step (B), after heating said suspension for a period of at least 6 hours, an additional amount of ammonium molybdate is added to said suspension in an amount stoichiometrically equivalent to the quantity of iron subsequently to be added in step (C) and thereafter:
    (C) gradually and homogeneously decreasing the pH of said suspension to a value of less than about 1.8 whereupon a solution of a tri-valent iron salt is gradually introduced into said suspension while maintaining said suspension under agitation and at a pH of between about 1.5 and 1.8, whereafter said suspension is maintained at or near the boiling temperature until substantially all of said tri-valent iron has been taken up by said precipitate.

6. The process of claim 5 wherein, in step (C), said solution of tri-valent iron salt is gradually introduced into said suspension by injection and at a rate not exceeding 0.05 gram molecule of tri-valent iron per liter of suspension per hour.

7. The process of claim 5 with the additional step, subsequent to step (C), of removing said precipitate from said suspension and mixing the separated precipitate with an aqueous suspension of an inert substance at a pH value of less than about 7 whereafter the resulting solids mixture is calcined at a temperature of at least about 400° C.

8. A process for the preparation of a catalyst system for the ammoxidation of olefines containing oxides of bismuth, molybdenum and iron wherein the ratio of iron to bismuth is greater than 0.4:1 which consists essentially in carrying out the steps of:
    (A) forming an aqueous acid solution containing ions of bismuth and ions of iron in an atomic ratio of from 0 to 0.4:1 relative to said bismuth ions, and an aqueous alkaline solution, injecting one of said solutions into the other while maintaining the pH of the resulting aqueous solution at a virtually constant value of at least about 7 whereby a precipitate of compounds of said ions is formed, and separating said precipitate from said resulting aqueous solution;
    (B) forming a suspension of said precipitate in an aqueous medium, adjusting the pH of said suspension to a value of between about 2.5 and 7, and while heating and agitating said suspension, and maintaining the pH of said suspension at a value greater than about 2.5, introducing an aqueous solution of ammonium molybdate into said suspension in an amount in excess of a molybdenum to bismuth atomic ratio of about 1:1 by an amount of molybdenum stoichiometrically equivalent to the quantity of iron precipitated in step (A), and at a rate no greater than 0.1 gram molecule of $MoO_4$ per liter of suspension per hour, thereafter heating said suspension at or near the boiling temperature for a period of at least 6 hours, whereby substantially all of said molybdenum is taken up by said precipitate; and subsequently adding to said suspension an additional amount of ammonium molybdate stoichiometrically equivalent to the quantity of iron subsequently to be added in step (C);
    (C) gradually and homogeneously decreasing the pH of said suspension to a value of less than about 1.8 whereupon a solution of a tri-valent iron salt is gradually introduced into said suspension while maintaining said suspension under agitation and at a pH of between about 1.5 and 1.8, whereafter said suspension is maintained at or near the boiling temperature until substantially all of said tri-valent iron has been taken up by said precipitate after which said precipitate is removed from said suspension; and (D) mixing said separated precipitate with an aqueous suspension of an inert substance at a pH value of less than about 7 whereafter the resulting solids mixture is calcined at a temperature of at least about 400° C.

References Cited

UNITED STATES PATENTS

| | | | |
|---|---|---|---|
| 3,171,859 | 3/1965 | Sennewald | 260—604 |
| 3,350,323 | 10/1967 | Willatt | 252—456 |
| 3,110,746 | 11/1963 | Voge | 260—680 |
| 2,941,007 | 6/1960 | Callahan | 260—604 |
| 3,226,422 | 12/1965 | Sennewald et al. | 252—437 X |
| 3,347,899 | 10/1967 | Caporali et al. | 252—454 X |

DANIEL E. WYMAN, Primary Examiner

W. J. SHINE, Assistant Examiner